US012395783B1

(12) United States Patent
Slaven

(10) Patent No.: US 12,395,783 B1
(45) Date of Patent: Aug. 19, 2025

(54) METHOD OF OPERATING A SOUND SYSTEM TO CREATE A FUNCTIONALLY MASSLESS DRIVER

(71) Applicant: Fred Slaven, West Sacramento, CA (US)

(72) Inventor: Fred Slaven, West Sacramento, CA (US)

(73) Assignee: Fourier Sound, Inc., West Sacramento, CA (US)

(*) Notice: Subject to any disclaimer, the term of this patent is extended or adjusted under 35 U.S.C. 154(b) by 4 days.

(21) Appl. No.: 18/814,459

(22) Filed: Aug. 23, 2024

(51) Int. Cl.
*H04R 3/12* (2006.01)
*H04R 1/02* (2006.01)
*H04R 1/24* (2006.01)

(52) U.S. Cl.
CPC ............... *H04R 1/24* (2013.01); *H04R 1/025* (2013.01); *H04R 3/12* (2013.01); *H04R 2430/03* (2013.01)

(58) Field of Classification Search
CPC ...... H04R 2430/03; H04R 3/12; H04R 1/025; H04R 1/24
USPC .......................... 381/111, 98–100, 103, 94.3
See application file for complete search history.

(56) References Cited

U.S. PATENT DOCUMENTS

| | | | | |
|---|---|---|---|---|
| 7,248,711 | B2 * | 7/2007 | Allegro | H04R 25/353 381/317 |
| 10,283,137 | B2 * | 5/2019 | Pakarinen | G10L 21/0232 |
| 11,089,401 | B2 * | 8/2021 | Cambrell | H04R 3/00 |
| 11,373,672 | B2 * | 6/2022 | Mesgarani | G10L 25/30 |
| 2014/0355786 | A1 * | 12/2014 | Betbeder | H03G 9/02 381/98 |

* cited by examiner

*Primary Examiner* — Disler Paul
(74) *Attorney, Agent, or Firm* — Michelle C. Lau

(57) ABSTRACT

The present invention is a method for operating a sound system to create a functionally massless driver to produce definitively higher quality sound than systems currently flooding the global commercial market. By exploiting the Fourier Theorem and its derivatives, the Fourier Transform and Inverse Fourier Transform, the present invention creates an innovative sound system technology that broadcasts unparalleled, superior sound by recognizing the significant limitations of modern drivers in reproducing complex analog waveforms. The Fourier Series data transformed from the original audio input is filtered to deliver specific frequencies of sinusoidal data directly to a desired number of amplifier/driver pairings, designing around the application of the Inverse Fourier Transform to eliminate the distortion caused by driver broadcast of nonlinear analog waveforms. The drivers broadcast the frequencies of the sinusoidal data, which is subsequently summed by natural physical laws to reproduce the complex analog input as high-definition audio soundwaves.

20 Claims, 9 Drawing Sheets

710

720

METHOD OF OPERATING A SOUND SYSTEM TO CREATE A FUNCTIONALLY MASSLESS DRIVER

FIELD OF THE INVENTION

The present invention generally relates to electronic circuitry. More specifically, the present invention relates to demodulation or transference of modulation from one carrier to another.

BACKGROUND OF THE INVENTION

This invention leverages the well-established science of the Fourier Theorem and the principles of acoustic propagation as modeled by modern physics. The Fourier Theorem and the Fourier Transform are pervasive in today's digital era, particularly within the audio recording industry.

To grasp the Fourier Theorem, it's crucial to dispel a common misconception about the physical properties of sound. Contrary to popular belief, we do not hear separate frequencies entering our ears simultaneously. Instead, we perceive a single complex waveform composed of the sum of frequencies present at any given moment. For instance, in a noisy environment with machinery, conversations, and various sounds, we hear one complex waveform that represents the sum of all these noises. This summation of frequencies results from natural physical laws, with complex wave forms representing the granular nature of music, speech, and virtually every other audible sound.

The same principle applies to music and sound produced by speakers. The rapid changes in musical structure and the infinite number of complex waves formed from a few sinusoidal frequencies varying in amplitude and phase create the illusion of hearing multiple frequencies simultaneously. This is a natural phenomenon modeled by the Fourier Theorem.

At the core of digital audio, the Fourier Theorem states that any periodic signal (such as music) is composed of a superposition of pure sine waves with frequency, phase, and amplitudes that are harmonically related to the signal's fundamental frequency. All information in an original analog waveform is retained in a frequency-amplitude domain. The frequency-amplitude domain is stored as a series of sinusoids, wherein the time variable is eliminated in this Fourier transformation. The stored sinusoids are known as the Fourier Series. Since the time variable is a known linear function, it can be removed without loss of information and subsequently added back in using an Inverse Fourier Transform function to recreate the analog waveform from the frequency-amplitude domain.

The highest quality sound produced from commercially available speaker systems is only as good as the current commercial technology. The typical progression of a signal chain recording from input to output of such speaker systems begins with an analog input signal that passes through a Fourier Transform to convert the information in the analog signal from the time-amplitude domain to a frequency-amplitude domain, creating a Fourier series of sinusoids that represents the transformation. Once the information is stored as the Fourier Series data, it can be stored in a digital medium for later playback or transmitted forward for immediate listening. Once transmitted forward, the Fourier Series data is summed by a mathematical function of the Inverse Fourier Transform on an electronic IC chip to recreate the original analog signal, which is subsequently sent forward to be amplified and broadcast by a speaker.

The digital format, such as CDs and hard drives, used for storing and playback of recordings is recognized in the industry to be not only far more efficient than analog methods, such as vinyl and tape, but, more important, it is definitively more accurate. The audible difference between the original analog recording and the eventual recreated signal of the digital format before speaker broadcast is typically less than 0.00001% distortion. In contrast, distortion of broadcast from today's best speaker systems is between 1-10% or higher depending on sound pressure level output. This represents a 1000 times greater distortion to the input signal. The weak link today when listening to recorded music that misses much of the finer and more subtle details from the original performance is due to the speaker system, not the electrical signal recreated by the Inverse Fourier transformation.

State-of-the-art loudspeakers have seen minimal improvement over the past fifty years. The basic design remains unchanged. Although machining tolerances, magnetic field strength, and lighter diaphragm materials have improved, performance gains have been marginal. Distortion levels remain around 1-10% for actual music or complex waveforms, with only a 3-4% improvement over the past five decades. In contrast, top-quality headphones exhibit distortion levels around 0.01%, due to ultra-thin diaphragms scarcely heavier than the air molecules around it. This is a distortion level at least 100 times less than loudspeakers. Loudspeaker diaphragms, by comparison, are many orders of magnitude heavier and, consequently, their mass significantly impedes their response and causes a phase lag output corresponding to the electrical input signal.

Even at low frequencies, e.g. 60 Hz-500 Hz, large drivers must respond instantly to remain in phase with complex waveform inputs, a performance so far only achievable by the best planar or electrostatic headphones. An electrical signal into a typical speaker system travels at light speed without feedback from the driver output, allowing delay and misalignment with the input signal, and hence resulting in distortion. This loss of signal information in audio loudspeakers results in diminished detail and dynamic range, and it is the fundamental complication that differentiates a recording from a life-like auditory experience.

While drivers struggle with producing complex waveforms, they excel at producing sine waves, a linear function easily reproduced by modern drivers with undetectable distortion. Modern driver designs inherently aid in sine wave or sinusoid reproduction due to their mechanical structure being designed for this purpose.

The balance of mechanical inertial mass from speaker components that move and must accelerate and reverse direction or brake instantly with speaker components providing aid in acceleration and braking is tuned to perfection when using sinusoids for input signals and testing. Without this balance, drivers would suffer near-total distortion. The inertial mass of a speaker can produce a near perfect sine wave when properly designed and balanced with modern techniques and materials.

Notwithstanding, producing perfect linearity of sine waves from modern drivers does not translate to producing complex waveforms as effectively. In fact, the industry standard of testing drivers with sine waves to ensure accuracy assumes that better sine wave production correlates with better complex waveform reproduction. However, this assumption holds limited validity as the non-linear nature of complex waveforms interacts differently with driver mechanics, which were specifically designed for ideal sine wave production. The result of this misconception is a more imperfect audio reproduction due to information loss and reduced dynamic range, more commonly known as distortion. When a speaker produces a sine wave, it never has to reverse direction of movement between polarity changes, hence the far superior performance with sine waves. Complex waveforms, on the other hand, frequently involve numerous reversals between polarity changes and many, if not most, simply get lost. To radically improve speaker performance after decades of minor advancement, a new approach is needed to reconfigure speaker technology.

SUMMARY OF THE INVENTION

The present invention is a method for operating a sound system to create a functionally massless driver to produce definitively higher quality sound than systems currently flooding the global commercial market. By exploiting the Fourier Theorem and its derivatives, the Fourier Transform and Inverse Fourier Transform, the present invention creates an innovative sound system technology that broadcasts unparalleled, superior sound by recognizing the significant limitations of modern drivers in reproducing complex analog waveforms. The Fourier Series data transformed from the original audio input is filtered to deliver specific frequencies of sinusoidal data directly to a desired number of amplifier/driver pairings, designing around the application of the Inverse Fourier Transform to eliminate the distortion caused by driver broadcast of nonlinear analog waveforms. The drivers broadcast the frequencies of the sinusoidal data, which are subsequently summed by natural physical laws as sine waves propagate from the drivers to reproduce the complex analog input as high-definition audio soundwaves.

The drivers of the present method remain in phase with the original analog waveform input since the recreation of the analog signal input is performed by the speaker itself instead of being summed on an IC chip. The resulting output from propagating sinusoids from the drivers maintains phase coherence with the original analog input signal. Further, instead of producing complex non-linear waveforms, the drivers produce near perfect sine wave that, when subsequently summed by the speaker, result in complex waveform distortion levels so low that the speaker can be described as having “functionally” massless drivers. Since the analog waveform is summed without hindrances of driver limitations, i.e. limitations eliminated by producing linear sine waves instead of complex non-linear waveforms, this method creates the first sound system to have functionally massless drivers producing a virtually identical copy of the original analog waveform at live venue volumes.

DESCRIPTION

This method for operating a sound system to create a functionally massless driver is engineered to produce definitively higher quality sound than systems currently flooding the global commercial market. By exploiting the Fourier Theorem and its derivatives, the Fourier Transform and the Inverse Fourier Transform, the present invention creates an innovative sound system technology that produces an unparalleled, superior sound broadcast. Recognizing the significant limitations of modern drivers in reproducing complex analog waveforms, the present invention bypasses traditional driver constraints by designing around application of the Inverse Fourier Transform algorithm to allow for a natural transpiration of sound wave production. The present method enables functionally massless drivers to produce a virtual copy of complex soundwaves.

Figure 1:
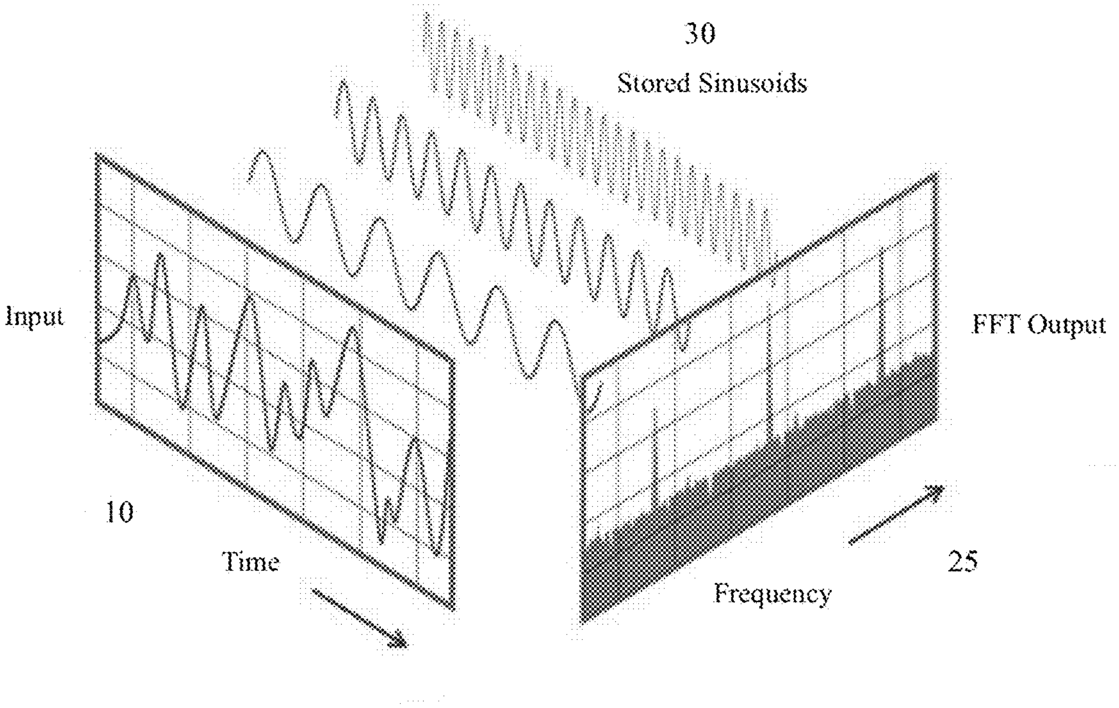
FIG. 1 illustrates graphical representation of an original analog waveform and a frequency-amplitude domain of Fourier series sinusoidal data.
Figure 2:
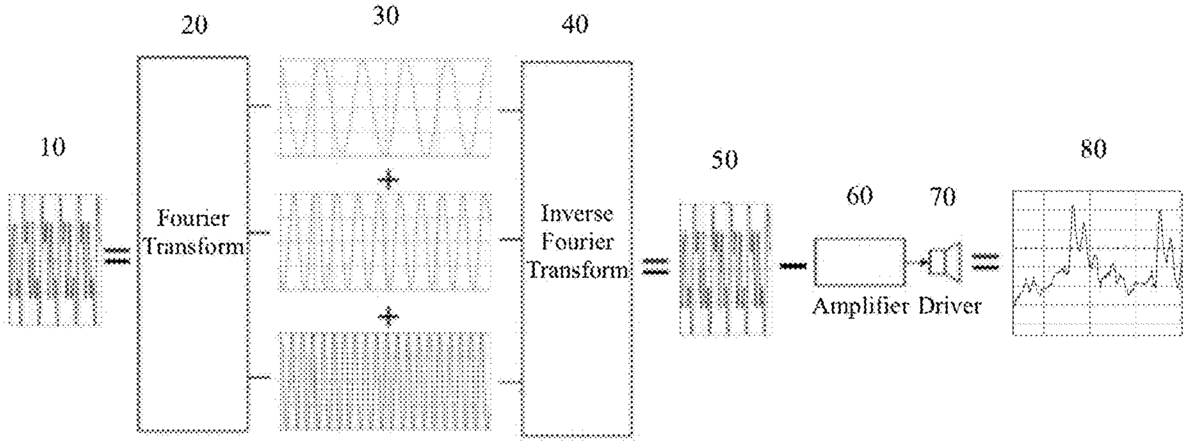
FIG. 2 illustrates progression of audio input in a current commercial speaker system.

As shown in FIGS. 1 and 2, current commercial speaker technology reproduces original audio input to broadcast complex analog soundwaves from the speaker system. The audio input is represented in an original analog waveform 10 and manipulated by a processing unit, such as an IC chip, using a Fourier Transform Function 20 to create a frequency-amplitude domain 25 by eliminating the time variable inherent in the analog waveform. The frequency-amplitude domain 25 is represented by a series of sinusoids 30, known as a Fourier Series. With the audio information translated into a Fourier Series, it can either be stored in a digital medium, such as CDs or hard drives, or it can be transmitted for broadcast by a speaker. Irrespective of the path, when it is time to retrieve the stored digital information for playback or when the information is transmitted to a speaker, the Fourier Series data is summed by a mathematical function of an Inverse Fourier Transform 40 on an electronic IC chip to recreate 50 the original analog signal. Since the time variable is a known linear function, it can be removed without loss of information and subsequently added back in using the Inverse Fourier Transform function 40 to recreate the analog waveform 50 from the frequency-amplitude domain.

FIG. 2 illustrates the starting point of reference for this invention and the basis for which a comparison is made to substantiate the phenomenal improvement in sound reproduction by the present invention. The signal transformation and routings shown in FIG. 2 are for current commercial speakers. The electrical signal 50 sent from the Inverse Fourier Transform IC chip has a remarkably insignificant distortion difference from the original analog waveform 10 of less than 0.00001%. However, this electrical signal 50 is then sent to an amplifier 60/driver 70 pairing wherein the driver broadcasts audio output 80 that has significantly high levels of distortion compared to the electrical input 50 fed to the speaker. Broadcast 80 from the best commercially available speaker systems is impacted by distortion 1-10% or greater, representing a 1000+ times greater distortion in the audio output from of the original audio input. As such, the output 80 of the speaker is the obstacle impeding higher quality sound, not the recording process, due to the distortion imposed at the broadcast from the driver.

Every speaker has at least three parts: enclosure, driver(s), and electrical components (crossovers, amplifiers). Speaker drivers are the most important part of every speaker, tasked with transforming electrical signals into sound. The enclosure houses the system components. Amplifiers amplify the electrical signal and improve accuracy of the output signal. Speakers with multiple drivers have crossovers to redirect signals of different frequencies to dedicated drivers.

Figure 3:
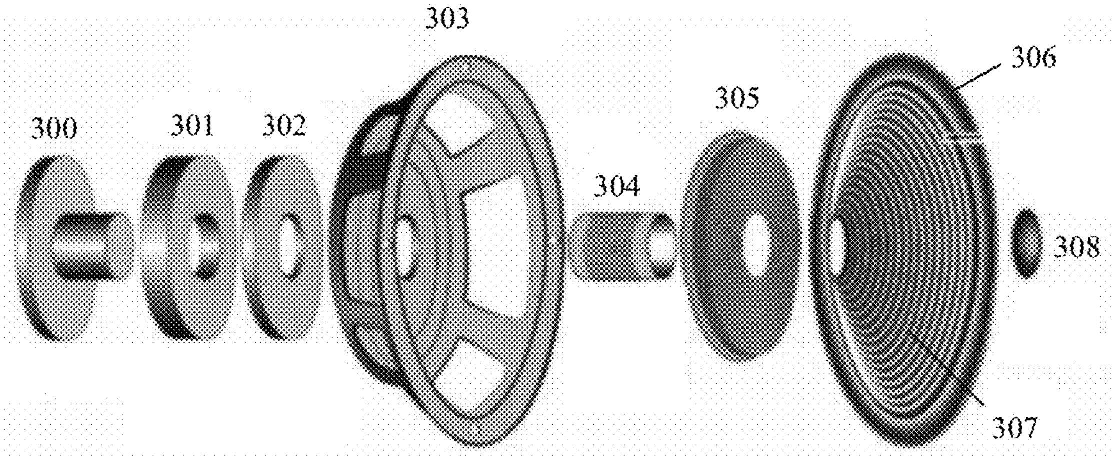
FIG. 3 illustrates components of a speaker driver.

FIG. 3 shows basic components of a speaker driver: a bottom plate 300, magnet 301, top plate 302, basket 303, voice coil 304, spider 305, diaphragm 306, surround 307, and dust cap 308. Due to the inertial mass and function of a voice coil 304, diaphragm 306, and dust cap 308, and a spider 305 and surround 307, which help counteract the negative effects of inertial mass with a spring tension, drivers are inherently able to interpret a sine wave input to generate a near-perfect sound wave output when properly designed with modern techniques and materials. However, the struggle for drivers to interpret complex waveforms is problematic and is the cause of the audible distortion impacting the broadcast as shown in FIG. 2 from the original audio input (see progression from the original input 10 to an equivalent reproduction of Fourier Series data 50 to the distorted broadcast audio output 80). The present method leverages the inherent properties of drivers to accurately broadcast sine waves, a linear function easily reproduced by modern drivers with undetectable distortion. Modern driver designs are conducive to creating precise sine wave or sinusoid reproduction due to their mechanical structure being designed specifically for this purpose.

The present method of this invention for operating a sound system to enable a functionally massless driver similarly captures the sinusoid production of the Fourier Transform function performed by the IC chip. However, rather than apply an Inverse Fourier Transform function to convert the sinusoid series to reproduce the original complex waveform to be sent to a speaker, the present method bypasses this step and sends the sinusoidal data directly to a desired number of amplifiers, which are connected to individual drivers.

Figure 4:
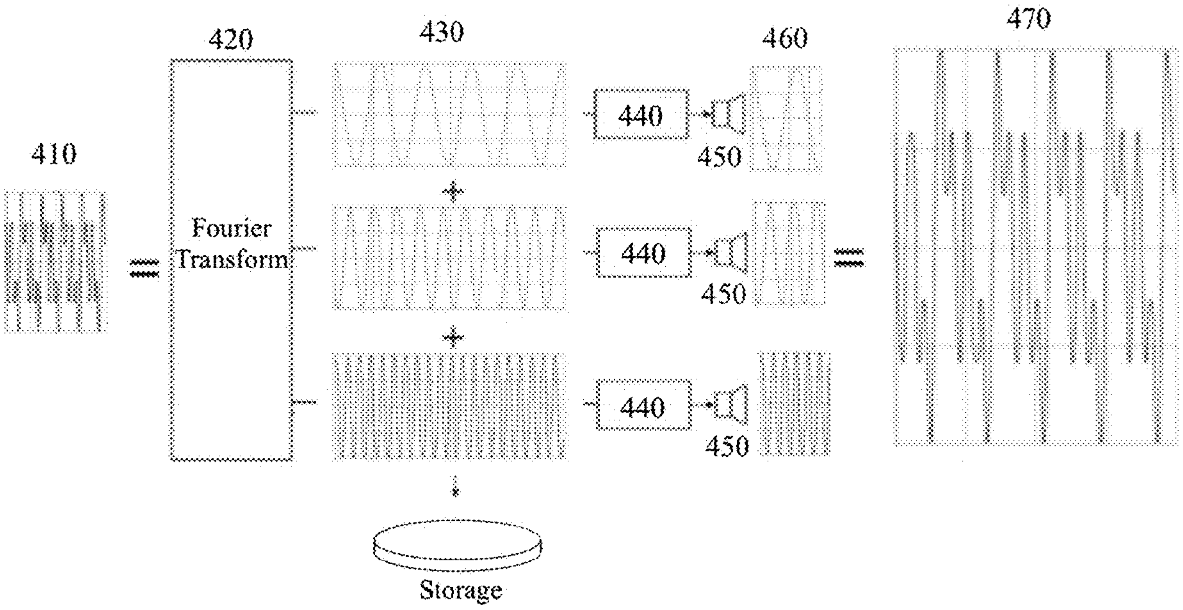
FIG. 4 illustrates the flow of the audio input in the present invention filtering sinusoidal data before transmission to the speaker.

FIG. 4 illustrates a schematic flow of the signal transformations and routings of the present invention for operating a sound system to create a functionally massless driver. The audio information is represented in an original analog waveform 410 and manipulated by a processing unit, such as an IC chip, using a Fourier Transform Function 420 to create a frequency-amplitude domain by eliminating the time variable inherent in the analog waveform. The frequency-amplitude domain is represented by a Fourier Series of sinusoid data 430. The processing unit may also determine if this data is to be stored for later playback or transmitted to an amplifier/driver pairing. When the data is determined to be transmitted to an amplifier/driver, the sinusoidal data is not summed by an Inverse Fourier mathematical algorithm on the processing unit to generate a complex waveform of audio data that would then be broadcast by the speaker system with intrinsic distortion. Rather, the present method sends the sinusoidal data directly to the amplifiers 440/drivers 450. The present method for creating a sound system to enable a functionally massless driver forgoes the Inverse Fourier Transform step to eliminate the weakest link in the signal chain found in all speakers today caused by driver broadcast of nonlinear analog waveforms.

The present method initially converts the original analog waveform 410 to the near-perfect production of a Fourier Series of sine waves 430 utilizing a Fourier Transform of a processing unit 420 to send the Fourier Series data 430 directly to specific amplifier 440/driver 450 pairings, bypassing any Inverse Fourier Transform DAC function. The processing unit 420 assigns an amplifier 440 its own sine wave frequencies 430, then sends the isolated frequency data 430 directly to its corresponding amplifier 440/driver 450. The sinusoidal data 430 is filtered using a design-specific number of sinusoidal gates to filter out all frequencies except the very narrow frequency range corresponding to a specific amplifier/driver pair. These drivers 450 are then able to transmit the sinusoidal data to broadcast a high-definition reproduction of the original analog input signal without the 1-10% distortion levels created by inefficient broadcast by drivers of complex analog data. The drivers 450 broadcast the frequencies 460 from the sinusoidal data 430 that is then summed by natural physical laws to reproduce the complex analog input 410 as high-definition audio sound 470.

Figure 5:
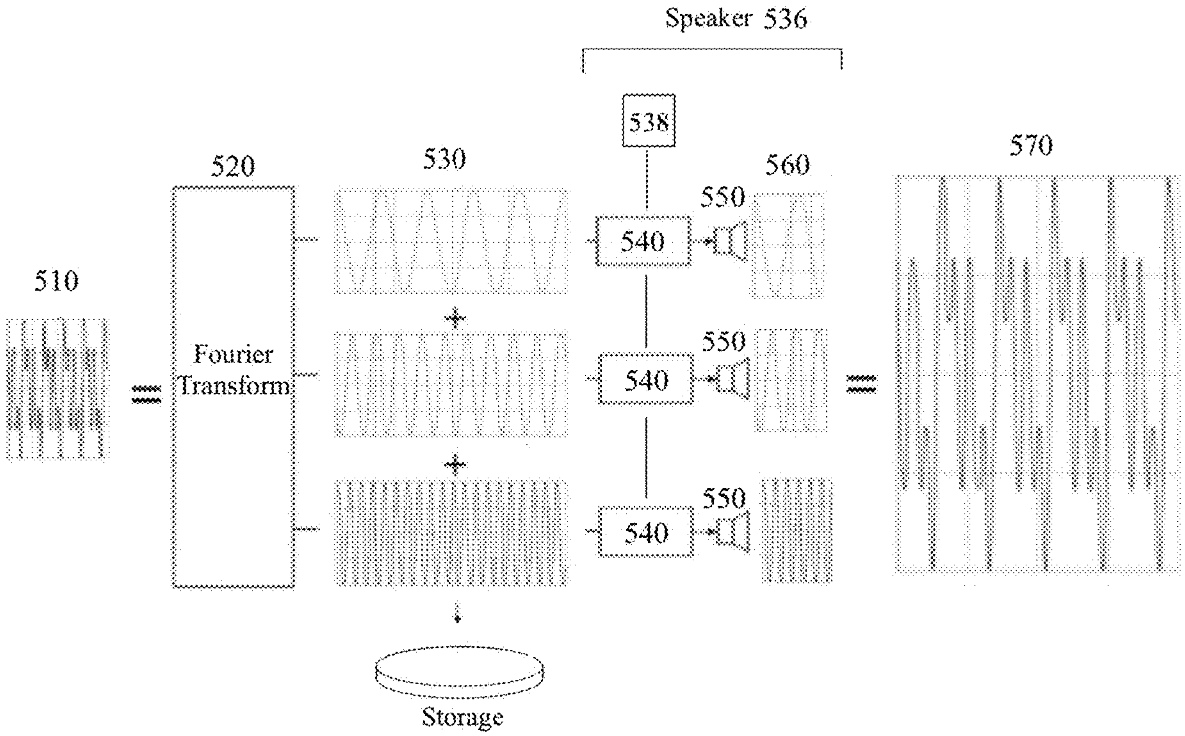
FIG. 5 illustrates the flow of the audio input in the present invention filtering sinusoidal data at the speaker.

Alternatively, the sinusoidal data may be filtered after being transmitted to the speaker, as shown in FIG. 5. The present alternative method converts the original analog waveform 510 to the near-perfect production of a Fourier Series of sine waves 530 utilizing a Fourier Transform of a processing unit 520. This sinusoidal data 530 is transmitted directly to a speaker 536, bypassing any Inverse Fourier Transform DAC function typically used to sum the sinusoidal data into a complex analog waveform. At the speaker, a processing component 538 assigns each amplifier 540 its own range of sine frequencies, then uses a design-specific number of sinusoidal gates to filter the data 530, filtering out all frequencies except the very narrow frequency range corresponding to the specific amplifier. The processing component 538 at the speaker then sends the isolated frequency data directly to its corresponding amplifier 540, each amplifier coupled to its own driver 550. The drivers 550 are then able to broadcast the sinusoidal data 530, which is instantaneously summed into complex soundwaves by natural physical laws to produce a virtually identical broadcast 570 of the original analog waveform 510—without the distortion levels created by inefficient broadcast by drivers of complex analog data.

Figure 6:
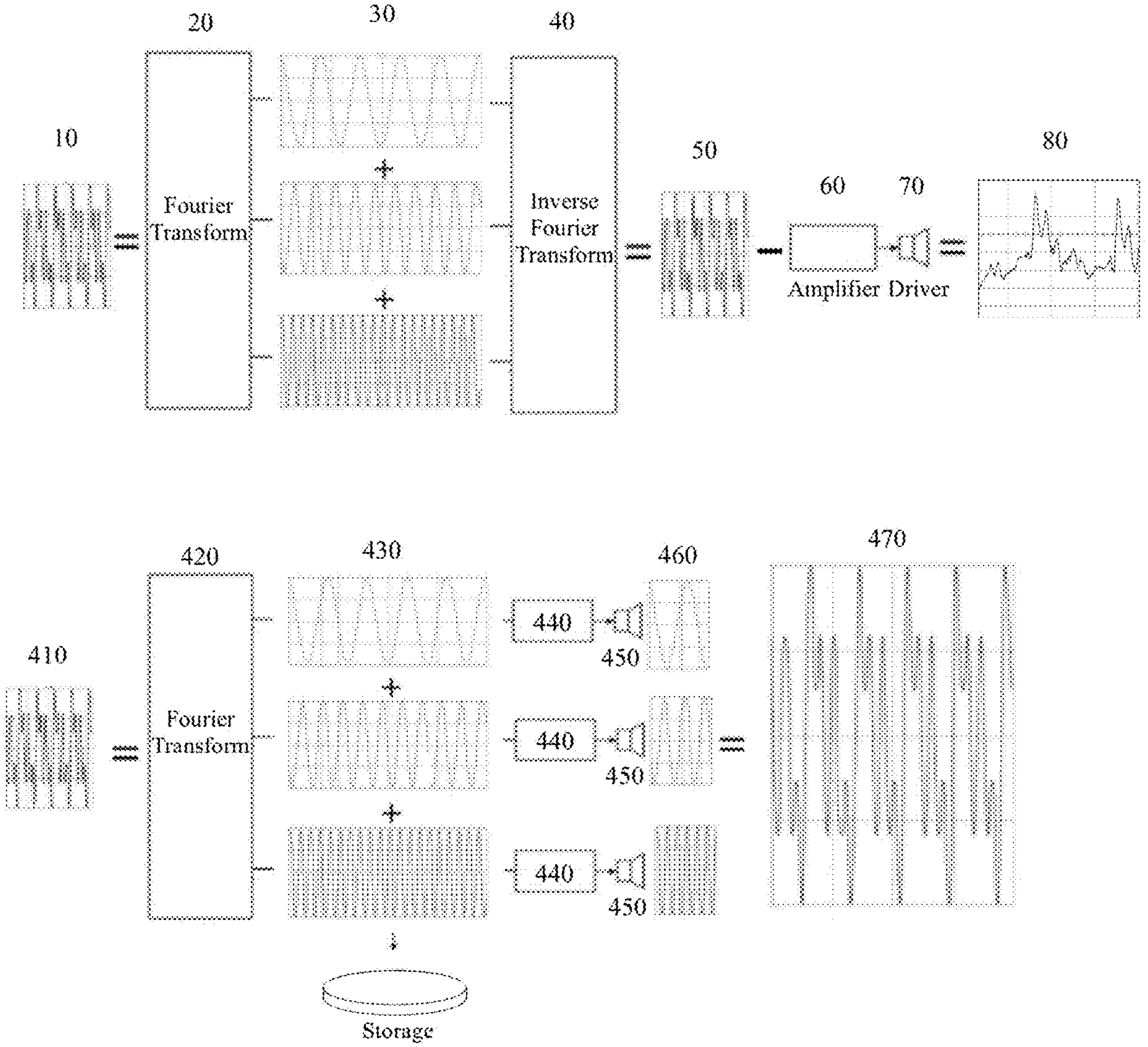
FIG. 6 illustrates a side-by-side comparison of a current commercial speaker flow and the flow of the present invention.

FIG. 6 shows a side-by-side comparison of the output 80 for current commercial speakers and the output 470 of the present invention, illustrating the revolutionary difference in audio output between the currently available commercial speaker system and the technology of the present invention. This present method performs the summation of the sinusoidal data with the same mathematical precision as that performed by an IC chip in an electronic circuit applying the Inverse Fourier Transform. However, while audio broadcast of the complex waveforms reproduced by the Inverse Fourier transformation is distorted from the original soundwaves, the present invention enables the speakers to broadcast sine waves instead of having to reproduce complex analog waveforms, thereby eliminating the distortion created by current commercial speakers amplifying the nonlinear analog waveform.

Figure 7:
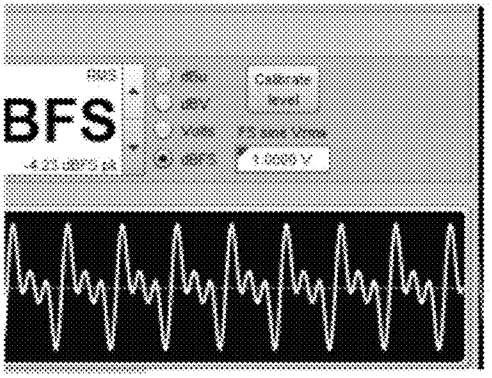
FIG. 7 illustrates a mathematical modeled complex wave pre-broadcast and a corresponding produced summation of sinusoidal frequencies.
Figure 7:
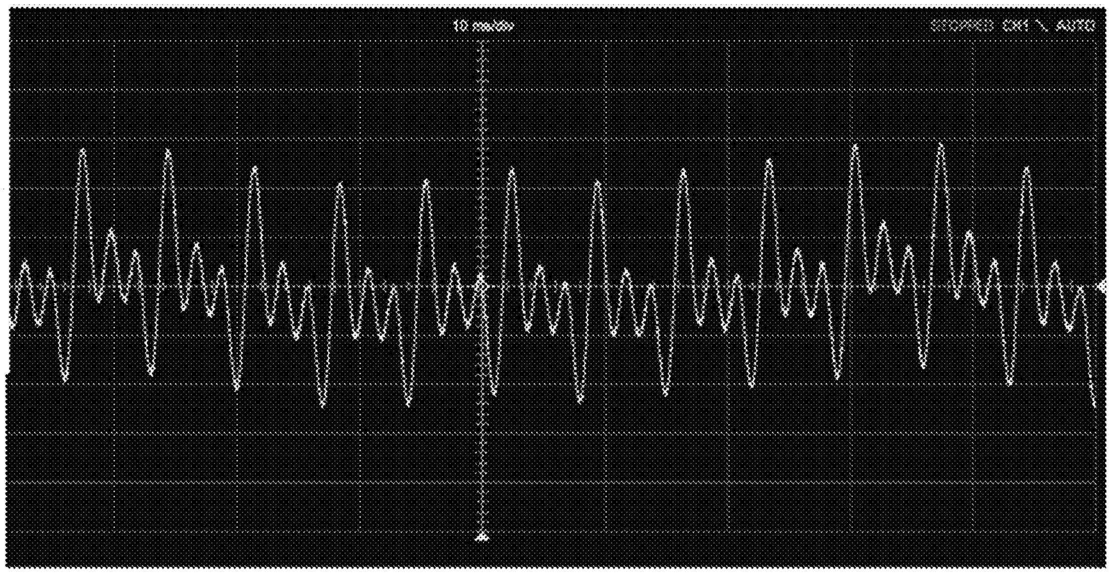

FIG. 7 illustrates two variations of a complex soundwave: a modeled waveform 710 and a produced waveform 720. The modeled waveform 710 was created by using the Inverse Fourier Series data to sum the Fourier Series data mathematically by an IC chip transformation prior to amplification as performed by current commercial speakers, using a mathematical representation of three frequencies: a fundamental and its first and second harmonics. This waveform 710 is not the actual soundwave output, i.e. the actual soundwave output would be significantly distorted by driver inefficiencies. It is a representation of the soundwave before being transmitted to a speaker. A comparison to this pre-output waveform 710 is made with a corresponding soundwave output 720 created by summing the sinusoidal data output by the drivers in the present invention. The produced waveform 720 is composed of output by three individual drivers reproducing a single sine wave underlying the complex waveform as the individual drivers are summed in the surrounding air. The sinusoidal data output by the individual drivers summed auditorily to reproduce the complex waveform 720 is a near equivalent match to the pre-output waveform 710, prior to any driver distortion. The modeled waveform of pre-output data 710 before being broadcast by a speaker system and the produced waveform of broadcast sound by the present invention 720 are virtually the same but for very subtle effects caused by room reverberations picked up by an attached microphone. This comparison of the modeled waveform 710 and the produced waveform 720 demonstrates the equivalency of summing the Fourier Series data output mathematically using an IC chip Inverse Fourier transformation and auditorily summing sine waves transmitted by drivers to generate complex soundwaves. The method of transmitting Fourier Series data output directly to speaker drivers without an Inverse Fourier transformation enables the drivers to generate soundwaves with virtually no distortion from the original audio input, resulting in far greater accuracy in reproducing recorded music.

Figure 8:
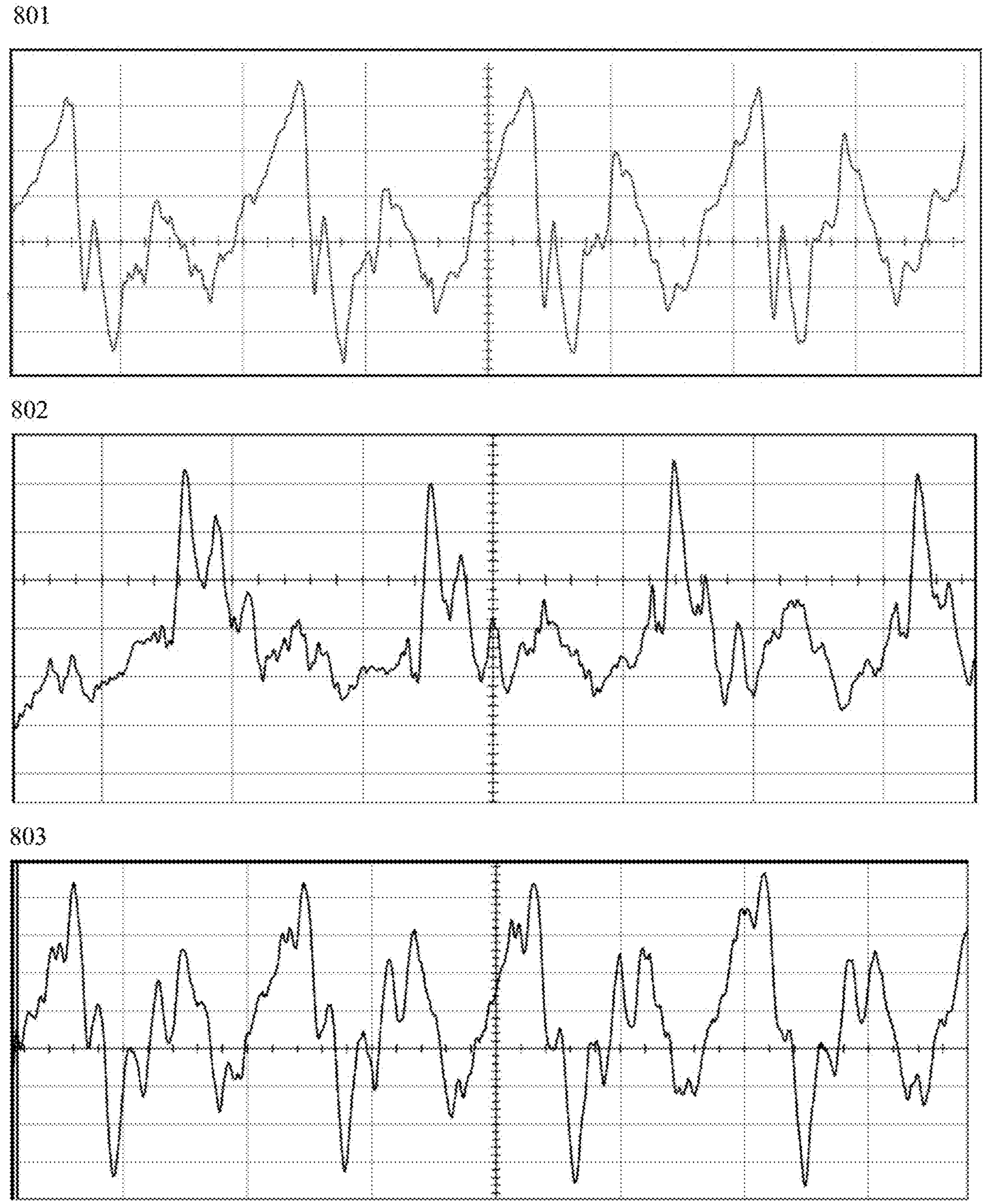
FIG. 8 illustrates a comparison of an original audio input, the audio input broadcast by a commercial system, and the audio input broadcast by the present method of invention.

FIG. 8 illustrates a musical sample of an audio input signal 801 recorded prior to amplification using a typical commercial full range speaker system and using the present method for operating a sound system to create a functionally massless driver. The broadcast data output 802 using the commercial speaker system shows a significant departure from the original input signal 801, the broadcast data output 802 dependent on drivers to reproduce the original audio recording by broadcasting complex analog data reproduced using an Inverse Fourier transformation. While some of the distortion may be due to room reflections picked up by the microphone, they do not account for the dramatic changes illustrated by the output data 802. Further, the same room reflections that impacted the commercial speaker system similarly impacted the present invention 803. However, despite identical interferences, the sound output of the present invention is very recognizable when compared to the original audio input signal. This method for operating a sound system to create a functionally massless driver offers significant improvements, distinguishing it from all contemporary speaker system operations. FIG. 8 shows the fundamental difference between commercial speaker systems and the present method of operation.

Figure 9:
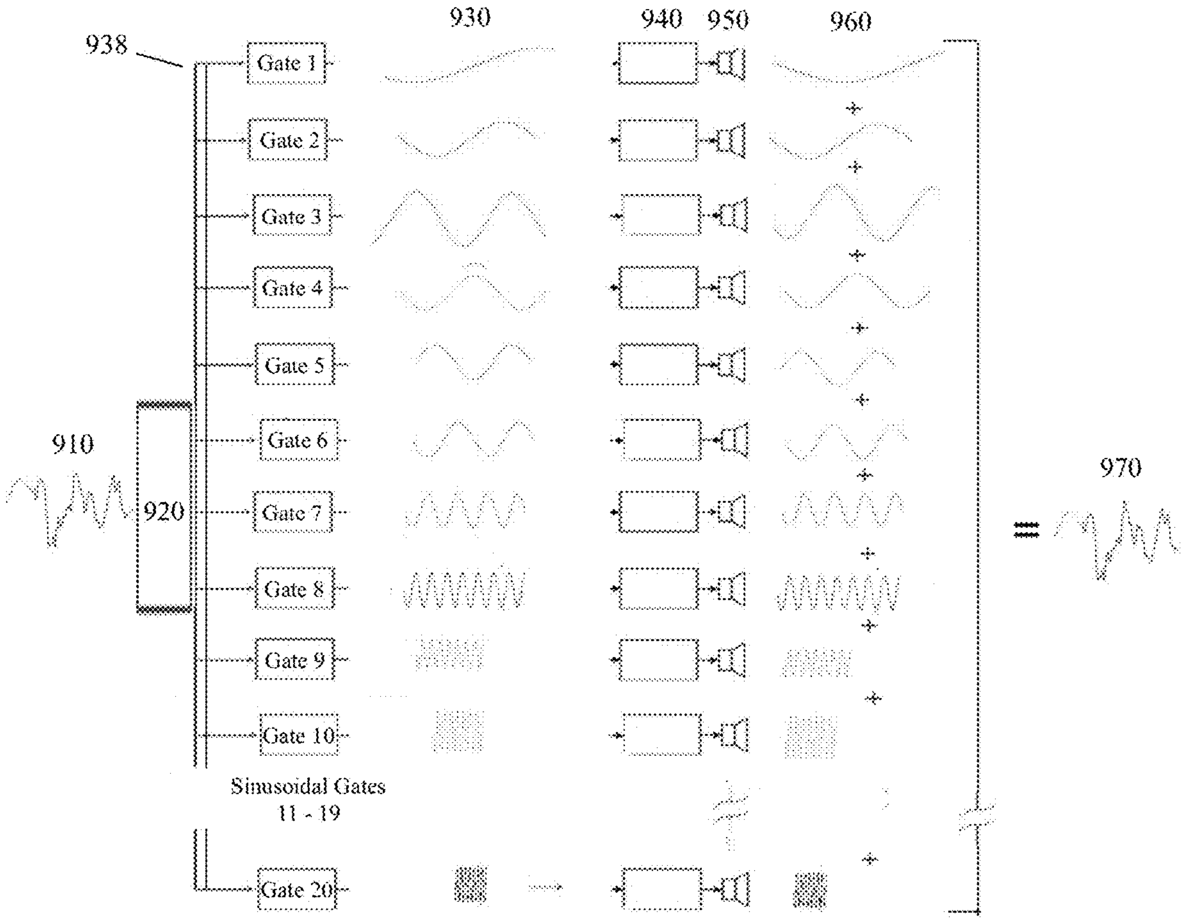
FIG. 9 illustrates the preferred method with processing of up to forty channels.

The preferred method is illustrated in FIG. 9, with an original audio input 910 transformed into Fourier Series data at a processing unit 920 then filtered into separate frequencies by either the processing unit or a second processing unit 938 at the speaker. The processing unit 938 supports up to forty channels for paired stereo output, twenty channels per stereo pair component, with gates 1-20 per pair covering a frequency range from 20 Hz to 8,000 Hz. Each channel has standard DSP functions with frequency filtering, amplitude adjustment, and time delay. While these may appear limited in range, they function within the required parameters of the overall speaker system. The preferred method of amplification has up to forty channels of input and output, with twenty channels per stereo pair component of amplifier 940 and driver 950. Each channel in this preferred method corresponds to a class D amplifier designed to handle the narrow range of frequencies specific to each amplifier channel. Each driver 950 in the speaker is fed a different sinusoid from the Fourier Series data 930. The preferred method includes operation of up to twenty drivers to feed a different sinusoid from the fundamental frequency to the almost inaudible 19th harmonic, summing the output 960 from the drivers to broadcast a virtually identical complex soundwave 970 to the original audio input 910.

Given that each driver produces at most three sinusoids at any given moment, a range of three bordering notes on a keyboard, hundreds or even thousands of drivers would theoretically be necessary to cover the range of human hearing, approximately 20 Hz to 20,000 Hz. However, an analysis of the Fourier Series, the structure of music and the human voice, the limitations of human hearing, and millisecond-to-millisecond changes in waveforms indicate that the actual number of required drivers is no more than twenty, and could be less, depending on the desired range of coverage with the Fourier Series. Focusing on the frequencies where the ear is most discerning, 40 Hz to 8,000 Hz covers most of the 20 Hz to 20,000 Hz range of human hearing. A single driver can handle frequencies above 8,000 Hz. Above this frequency, the ears' abilities to discern errors are negligible. The Fourier Series, comprising a fundamental frequency and its harmonics, effectively filters out 99.997% of frequencies within the remaining 40 Hz to 8,000 Hz. Since music typically involves no more than eight simultaneous different notes or tones, the required driver count is even further reduced. The narrow range of the human voice fundamentals, usually 60 Hz to 300 Hz, and instrument range fundamentals, typically 30 Hz to 800 Hz, the range where the ear is most sensitive, could be covered with only eight drivers out to the 5th harmonic. The rapid rate of change in a typical musical signal, changing millisecond to millisecond, makes the likelihood of twenty drivers being audibly insufficient impossible.

An integral aspect of this method is ensuring phase coherence among drivers. This is achieved through vertical stacking of the drivers for horizontal phase coherence, as all the drivers share an identical zero phase horizontal reference point. Vertical displacement signal errors are corrected with minimal digital signal processing (DSP) time delay, a design that maintains wave coherence both horizontally and vertically. The drivers are preferably hung with non-resonant nylon threaded rods. The driver cones are facing upwards for phase coherence, with larger drivers at the bottom for weight stability. The drivers may vary in size, with the preferable method using 20" drivers, gradually diminishing in size until a treble range above 3,000 Hz is reached.

This present method not only recreates the original analog waveform, but the soundwaves are amplified by the many sinusoidal drivers to a volume level one can hear in the largest rooms-a near perfect reconstruction of the analog input signal at concert hall volumes. This invention performs the amplification and summation of the Fourier Series all in one process, achieving a new standard in low distortion and dynamic output for a full range sound system.

The invention claimed is:

1. A method for operating a sound system comprising:

Receiving an original complex audio waveform;

Manipulating said original audio waveform using a processor performing a Fourier transformation to create a frequency-amplitude domain of sinusoidal data, wherein said processor comprises at least one sinusoidal gate;

Assigning each said at least one sinusoidal gate a unique range of frequencies that corresponds to at least one amplifier;

Using said at least one sinusoidal gate to filter said sinusoidal data into at least one range of frequencies;

Transmitting said at least one range of frequencies to a speaker comprising said at least one amplifier coupled to at least one driver while preserving said sinusoidal data without using an Inverse Fourier function to generate a new complex audio waveform, wherein said at least one range of frequencies is received by said at least one amplifier;

Transmitting said at least one range of frequencies from said at least one amplifier to said at least one driver;

Broadcasting said at least one range of frequencies from said at least one driver;

Summing said at least one range of frequencies to create a reproduction of said original complex audio waveform;

Broadcasting said reproduction of said original complex audio waveform from said speaker.

2. A method for operating a sound system as in claim 1, wherein said at least one driver comprises two or more drivers stacked vertically for horizontal phase coherence in order of heaviest weight at a lowest position for weight stability.

3. A method for operating a sound system as in claim 2, wherein said two or more drivers are hung using non-resonant nylon threaded rods.

4. A method for operating a sound system as in claim 1, wherein said at least one driver comprises a cone having a large orifice and a small orifice at opposite ends, wherein said at least one driver is positioned with said large orifice of said cone facing upwards and positioned above said small orifice for phase coherence.

5. A method for operating a sound system as in claim 1, wherein said at least one driver has a largest driver of at least twenty inches in diameter, with additional drivers gradually diminishing in size until a treble range above 3,000 Hz is reached.

6. A method for operating a sound system as in claim 1, wherein said processor supports up to forty channels corresponding to twenty pairs of said at least one amplifier coupled to said at least one driver.

7. A method for operating a sound system as in claim 6, further comprising up to twenty gates corresponding to said twenty pairs of said at least one amplifier coupled to said at least one driver.

8. A method for operating a sound system as in claim 7, wherein said up to twenty gates covers a frequency range from 20 Hz to 8,000 Hz.

9. A method for operating a sound system as in claim 8, wherein each channel of said up to forty channels has standard digital signal processing (DSP) functions, including frequency filtering, amplitude adjustment, and time delay, and wherein DSP functions are used to correct displacement signal errors to maintain wave coherence both horizontally and vertically.

10. A method for operating a sound system as in claim 9, wherein said at least one amplifier comprises a class D amplifier designed to handle a narrow range of frequencies specific to said each channel.

11. A method for operating a sound system comprising:

Receiving an original complex audio waveform;

Manipulating said original complex audio waveform using a processor performing a Fourier transformation to create a frequency-amplitude domain of sinusoidal data;

Transmitting said sinusoidal data to a speaker, wherein said speaker comprises a processor, at least one amplifier, and at least one driver, wherein said at least one amplifier is coupled to said at least one driver, and wherein said processor comprises at least one sinusoidal gate;

Assigning each said at least one sinusoidal gate a unique range of frequencies that corresponds to said at least one amplifier;

Using said at least one sinusoidal gate to filter said sinusoidal data into at least one range of frequencies;

Transmitting said at least one range of frequencies to said at least one amplifier while preserving said sinusoidal data without using an Inverse Fourier function to generate a new complex audio waveform, wherein said at least one range of frequencies is received by said at least one amplifier;

Transmitting said at least one range of frequencies from said at least one amplifier to said at least one driver;

Broadcasting said at least one range of frequencies from said at least one driver;

Summing said at least one range of frequencies to create a reproduction of said original complex audio waveform;

Broadcasting said reproduction of said original complex audio waveform from said speaker.

12. A method for operating a sound system as in claim 11, wherein said at least one driver comprises two or more drivers stacked vertically for horizontal phase coherence in order of heaviest weight at a lowest position for weight stability.

13. A method for operating a sound system as in claim 12, wherein said two or more drivers are hung using non-resonant nylon threaded rods.

14. A method for operating a sound system as in claim 11, wherein said at least one driver comprises a cone having a large orifice and a small orifice at opposite ends, wherein said at least one driver is positioned with said large orifice of said cone facing upwards and positioned above said small orifice for phase coherence.

15. A method for operating a sound system as in claim 11, wherein said at least one driver has a largest driver of at least twenty inches in diameter, with additional drivers gradually diminishing in size until a treble range above 3,000 Hz is reached.

16. A method for operating a sound system as in claim 11, wherein said processor supports up to forty channels for twenty pairs of said at least one amplifier coupled to said at least one driver.

17. A method for operating a sound system as in claim 16, further comprising up to twenty gates corresponding to said twenty pairs of said at least one amplifier coupled to said at least one driver.

18. A method for operating a sound system as in claim 17, wherein said up to twenty gates covers a frequency range from 20 Hz to 8,000 Hz.

19. A method for operating a sound system as in claim 18, wherein each channel of said up to forty channels has standard digital signal processing (DSP) functions, including frequency filtering, amplitude adjustment, and time delay, and wherein DSP functions are used to correct displacement signal errors to maintain wave coherence both horizontally and vertically.

20. A method for operating a sound system as in claim 19, wherein said at least one amplifier comprises a class D amplifier designed to handle a narrow range of frequencies specific to said each channel.

* * * * *